US008601458B2

(12) United States Patent
Andrade et al.

(10) Patent No.: US 8,601,458 B2
(45) Date of Patent: Dec. 3, 2013

(54) PROFILE-DRIVEN DATA STREAM PROCESSING

(75) Inventors: Henrique Andrade, Croton-on-Hudson, NY (US); Bugra Gedik, White Plains, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 12/465,757

(22) Filed: May 14, 2009

(65) Prior Publication Data

US 2010/0293535 A1    Nov. 18, 2010

(51) Int. Cl.
*G06F 9/45* (2006.01)
(52) U.S. Cl.
USPC .......................................... 717/156; 717/155
(58) Field of Classification Search
USPC ................................................ 717/155, 156
See application file for complete search history.

(56) References Cited

U.S. PATENT DOCUMENTS

| | | | |
|---|---|---|---|
| 7,703,085 B2* | 4/2010 | Poznanovic et al. | 717/140 |
| 2003/0088855 A1* | 5/2003 | Kuzemchak et al. | 717/134 |
| 2006/0235947 A1* | 10/2006 | Gray et al. | 709/218 |
| 2007/0112948 A1* | 5/2007 | Uhlik | 709/223 |
| 2007/0174335 A1* | 7/2007 | Konig et al. | 707/736 |
| 2007/0261041 A1 | 11/2007 | Amini et al. | |
| 2008/0016095 A1* | 1/2008 | Bhatnagar et al. | 707/101 |
| 2008/0134158 A1* | 6/2008 | Salz et al. | 717/148 |
| 2008/0235685 A1 | 9/2008 | Amini et al. | |

OTHER PUBLICATIONS

Abadi et al. The Design of the Borealis Stream Processing Engine, Proceedings of the 2005 CIDR Conference.
Beynon et al., DataCutter: Middleware for Filtering Very Large Scientific Datasets on Archival Storage Systems, Proceedings of the 8th Goddard Conference on Mass Storage Systems and Technologies/17th IEEE Symposium on Mass Storage Systems, College Park, MD, Mar. 2000.
Caltech. Sensing and Responding: Mani Chandy's biologically inspired approach to crisis management. ENGenious—Caltech Division of Engineering and Applied Sciences, Winter 2003.
Reuters Professional—stock market data feed. http://about.reuters.com/productinfo/s/ stock market data feed, Oct. 2007.
Jain et al., Design Implementation, and Evaluation of the Linear Road Benchmark on the Stream Processing Core, International Conference on Management of Data, ACM SIGMOD, Chicago, IL 2006.

(Continued)

*Primary Examiner* — Li B Zhen
*Assistant Examiner* — Bradford Wheaton
(74) *Attorney, Agent, or Firm* — Ryan, Mason & Lewis, LLP (57) ABSTRACT

Techniques for compiling a data stream processing application are provided. The techniques include receiving, by a compiler executing on a computer system, source code for a data stream processing application, wherein the source code comprises source code for a plurality of operators, each of which performs a data processing function, determining, by the compiler, one or more characteristics of operators within the data stream processing application, grouping, by the compiler, the operators into one or more execution containers based on the one or more characteristics, and compiling, by the compiler, the source code for the data stream processing application into executable code, wherein the executable code comprises a plurality of execution units, wherein each execution unit contains one or more of the operators, wherein each operator is assigned to an execution unit based on the grouping, and wherein each execution unit is to be executed in a partition.

19 Claims, 7 Drawing Sheets

(56) References Cited

OTHER PUBLICATIONS

MATLAB, http://www.mathworks.com, Oct. 2007.
Upadhyaya et al., Expressing and Exploiting Concurrency in Networked Applications with Aspen, Symposium on Principles and Practice of Parallel Programming, ACM PPoPP, San Jose, CA 2007.
Amini et al., SPC: A Distributed, Scalable Platform for Data Mining, Workshop on Data Mining Standards, Services and Platforms, DM-SSP, Philadelphia, PA 2006.
Carzaniga et al., Design and Evaluation of a Wide-Area Even Notification Service, ACM Transactions on Computer System, 19(3):332-383, 2001.
L. Davidsen, Building an ESB without limits. ftp://ftp.software.ibm.com/software/integration/library/whitepapers/WSW11320-UsEn-00.pdf, May 2007.
Kurc et al., Querying Very Large Multi-dimensional Datasets in ADR, Proceedings of the 1999 ACM/IEEE SC Conference, SC 1999, Portland, OR, Nov. 1999.
Thies et al., StreamIt: A Language for Streaming Applications, International Conference on Compiler Construction, ICCC, Grenoble, France, Apr. 2002.
Vitter, Random Sampling with a Reservoir, ACM Transactions on Mathematical Software, 11:37-57, 1985.
Arasu et al., The CQL Continuous Query Language: Semantic Foundations and Query Execution, Technical Report, InfoLab—Stanford University, Oct. 2003.
Chakravarthy et al., Multiple Query Processing in Deductive Databases using Query Graphs, Proceedings of the 12th International Conference on Very Large Databases, Kyoto, Aug. 1986.
Pauw et al., Streamsight—A Visualization Tool for Large-Scale Streaming Applications, Symposium on Software Visualization, ACM Soft Vis, Herrsching am Ammersee, Germany, 2008.
Wolf et al., SODA: An Optimizing Scheduler for Large-Scale Stream-Based Distributed Computer Systems, Technical Report RC 24453, IBM Research, Dec. 2007.
Tu et al., Load Shedding in Stream Databases: A Control-Based Approach, Very Large Data Bases Conference, VLDB, Sep. 2006.
Arasu et al., STREAM: The Stanford Stream Data Manager, IEEE Data Engineering Bulletin, 26, 2003.
Chandrasekaran et al., TelegraphCQ: Continuous Dataflow Processing for an Uncertain World, Conference on Innovative Data Systems Research, CIDR, 2003.
Energy Information Administration, Electric power industry overview. http://www/eia.doe/gov/cneaf/electricity/page/prim2/toc2.html, Oct. 2007.
IBM WebSphere Front Office for Financial Markets, Version 3.0—WebSphere , http://www.ibm.com/software/integration/wfo, Oct. 2007.
Wu et al., Challenges and Experience in Prototyping a Multi-Modal Stream Analytic and Monitoring Application on System S. Very Large Data Bases Conference, VLDB, 2007.
Gedik et al., SPADE: The System S Declarative Stream Processing Engine, International Conference on Management of Data, ACM SIGMOD, Vancouver, Canada, 2008.
Leighton et al., Multicommodity Max-flow Min-cut Theorems and their Use in Designing Approximation Algorithms, Journal of the ACM 46(6), 1999, pp. 787-832.
Andrade et al., Scale-up Strategies for Processing High-Rate Data Streams in System S, International Conference on Supercomputing, ACM ICS, 2008.
Balakrishnan et al., Retrospective on Aurora, VLDB Journal, Special Issue on Data Stream Processing, 2004.

Coral8, Inc., http://www.coral8.com, May 2007.
IBM DB2. http://www.ibm.com/db2, Oct. 2007.
Gedik et at., CellSort: High Performance Sorting on the Cell Processor, Proceedings of the Very Large Data Bases Conference, VLDB, 2007.
Gedik, et al., Executing Stream Joins on the Cell Processor, Proceedings of the Very Large Data Bases Conference, VLDB, 2007.
Girod, et al., XStream: a Signal-Oriented Data Stream Management System, Proceedings of the International Conference on Data Engineering, IEEE ICDE, 2008.
IBM General Parallel File System, http://www.ibm.com/system/clusters/software/gpfs, Oct. 2007.
Hulten et al., VFML—a toolkit for mining high-speed time-changing data streams, http://www.cs.washington.edu/dm/vfml/, 2003.
IBM, Celll Broadband Engine Architecture and its First Implementation, Technical Report Version 1.0, IBM Systems and Technology Group, 2005.
Intel. IXP2400 Network Processor Hardware Reference Manual. Technical report, Intel Corporation, May 2003.
Liu et al., Use of OWL for describing Stream Processing Components to Enable Automatic Composition, In OWL: Experiences and Directions, OWLED, 2007.
Jacques-Silva et al., Towards autonomic fault recovery in System S. In Proceedings of the International Conference on Autonomic Computing, ICAC (2007).
LOFAR. http://www.lofar.org/, Jun. 2008.
LOIS. http://www.lois-space.net/, Jun. 2008.
Olston et al., Pig Latin: A not-so-foreign language for data processing. In Proceedings of the International Conference on Management of Data, ACM SIGMOD (2008).
Roman et al., Dynamic Application Composition—Customizing the behavior of an active space.
Davidyuk et al., An algorithm for task-based application composition.
Li et al., Enabling dynamic composition and coordination for autonomic grid applications using the rudder agent framework. Knowledge Engineering Review, vol. 00:0, 1-15, 2006.
U.S. Appl. No. 12/130,034, filed May 30, 2008, entitled "Method for Generating a Distributed Stream Processing Application."
U.S. Appl. No. 12/139,651, filed Jun. 16, 2008, entitled "Method for High-Performance Data Stream Processing."
U.S. Appl. No. 12/466,017, filed May 14, 2009, entitled "Application Resource Model Composition from Constituent Components."
U.S. Appl. No. 12/489,805, filed Jun. 23, 2009, entitled "Partioning Operator Flow Graphs."
U.S. Appl. No. 12/465,910, filed May 14, 2009, entitled "Dynamically Composing Data Stream Processing Applications."
Hadoop, http://hadoop.apache.org, 2007 The Apache Software Foundation.
Emigh, Morningstar detangles options data, http://www.windowsfs.com/TheMag/tabid/54/articleType/ArticleView/articleId/2185/Morningstar-Detangles-Options-Data.aspx downloaded Oct. 2, 2008.
StreamBase Systems http://www.streambase.com 2008 StreamBase Systems.
IBM Unstructured Information Management Architecture (UIMA), http://www.research.ibm.com/UIMA downloaded Oct. 2, 2008.
Oracle. http://en.wikipedia.org/wiki/Oracle_machine downloaded Aug. 5, 2009.
Publish/Subscribe. http://en.wikipedia.org/wiki/Publish/subscribe downloaded Aug. 5, 2009.
XEP-0060: Publish-Subscribe: http://xmpp.org/extensions/xep-0060.html downloaded Sep. 3, 2008.

* cited by examiner

PROFILE-DRIVEN DATA STREAM PROCESSING

GOVERNMENT CONTRACT

This invention was made with Government support under Contract No.: H98230-07-C-0383, awarded by the United States Department of Defense. The Government has certain rights in this invention.

FIELD OF THE INVENTION

Embodiments of the invention generally relate to information technology, and, more particularly, to data stream processing.

BACKGROUND OF THE INVENTION

In an increasingly information-centric world, people and organizations rely on time-critical tasks that require accessing data from highly dynamic information sources and generating responses derived from on-line processing of data in near real-time. In many application domains, these information sources can take the form of data streams that are time-ordered series of events or sensor readings.

Due to the large and growing number of users, jobs, and information sources, as well as the high aggregate rate of data streams distributed across remote sources, performance and scalability are key challenges in stream processing systems (SPSs). In some programming models, stream processing applications may be made up of a group of operators, which may be small pieces of code that carries out functions such as generic data transformations, filtering, annotation, classification, de-multiplexing, splitting or other domain-specific operations. Operators may interact through streams, which can carry a potentially infinite sequence of tuples. A challenge in building distributed stream processing applications is to find an effective and flexible way of mapping the logical graph of operators into a physical one that can be deployed on a set of distributed nodes. This involves finding how best to assign operators to computing nodes that execute the operators. That is, a challenge in building high-performance distributed stream processing applications is to find the right level of granularity in mapping operators to processes to be deployed on a set of distributed compute nodes. The challenge of creating flow graphs for deployment, out of user-specified operator-level flow graphs, has flexibility and performance aspects.

SUMMARY OF THE INVENTION

Principles and embodiments of the invention provide techniques for profile-driven data stream processing. An exemplary method (which may be computer-implemented) for compiling a data stream processing application, according to one aspect of the invention, can include steps of receiving, by a compiler executing on a computer system, source code for a data stream processing application, wherein the source code comprises source code for a plurality of operators, each of which performs a data processing function, determining, by the compiler, one or more characteristics of operators within is the data stream processing application, grouping, by the compiler, the operators into one or more execution containers based on the one or more characteristics, and compiling, by the compiler, the source code for the data stream processing application into executable code, wherein the executable code comprises a plurality of execution units, wherein each execution unit contains one or more of the operators, wherein each operator is assigned to an execution unit based on the grouping, and wherein each execution unit is to be executed in a partition.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include optimizing high-performance data stream processing (for example a distributed data stream processing application and/or a non-distributed data stream processing application in a multi-core system). One or more embodiments of the invention include a code generation technique for compiling high-performance distributed data stream processing applications, for example, in the context of the SPADE language and compiler, and an INFOSPHERE STREAMS stream processing system, commercially available from International Business Machines Corporation of Armonk, N.Y. SPADE stands for "Stream Processing Application Declarative Engine," a programming language and compilation infrastructure specifically built for streaming systems. The SPADE programming model is more fully described by Gedik et al. in "SPADE: The System S Declarative Stream Processing Engine," SIGMOD Conference 2008: 1123-1134. As further described herein, stream processing applications can be expressed using an operator-based, stream-centric language (for example, one referred to herein as SPADE), which supports composing distributed data flow graphs out of toolkits of type-generic operators.

One or more embodiments of the invention include a two-stage compilation technique, where an instrumented version of an application is generated by a compiler to profile and collect statistics about the processing and communication characteristics of the operators within the application. An example of instrumentation is the insertion of informative statements into software for the purpose of monitoring the operation of the software. Later, when the instrumented software executes, such informative statements may be used to provide information on how the code operates. Also, the profiling information can be fed to an optimizer to generate a physical data flow graph that is deployable across nodes in a computing cluster. The techniques described herein not only create highly optimized applications that are tailored to the underlying computing and networking infrastructure, but also make it possible to re-target the application to a different hardware setup by simply repeating the compilation step and re-compiling the application to match the physical flow graph produced by the optimizer.

Further, one or more embodiments of the invention include a code generation scheme to create containers that fuse operators such that stream connections between the operators within the same container are reduced to function calls, making them highly efficient compared to streams that cross container boundaries. The techniques detailed herein also include a profiling scheme to learn computation and communication characteristics of the operators in a data flow graph.

In profiling mode, for example, the compiler can emit instrumentation code that not only collects these statistics with little run-time overhead, but also achieves that in a fusion-transparent manner. That is, the same level of information can be collected irrespective of how the application is fused. One or more embodiments of the invention also include using an optimizer to determine an effective partitioning of the operators into execution containers. For example, one can use a greedy optimizer, whose primary heuristic is to fuse operators until the overhead of tuple transfers is an acceptable fraction of the total cost of executing all of the operator logic within an execution container.

As detailed herein, operator fusion can include using fine-granularity operators to make a larger operator that fits the resources available on a given node. Code generation can include generating a container code that efficiently implements fusion, and compiler-based optimization can be driven, for example, by automatic profiling and/or incremental learning of application characteristics. Also, one or more embodiments of the invention use operator level metrics, wherein re-use metrics collection is at the processing element (PE) level. One can run in PE-per-operator (OP) mode to get OP level metrics, and scaling may not occur because the number of OPs may be high.

By way of example, applications may be composed of jobs that take the form of data flow graphs. A data flow graph is a set of operators connected to each other via streams. Each operator can have zero or more input ports, as well as zero or more output ports. An operator that lacks input ports is called a source, and similarly, an operator that lacks output ports is called a sink. Each output port creates a stream, which carries tuples flowing toward the input ports that are subscribed to the output port. An output port can publish to multiple input ports, and dually, an input port can subscribe to multiple output ports, all subject to type compatibility constraints. Data flow graphs are allowed to contain feed-back loops that may form cycles in the graph.

Figure 1:
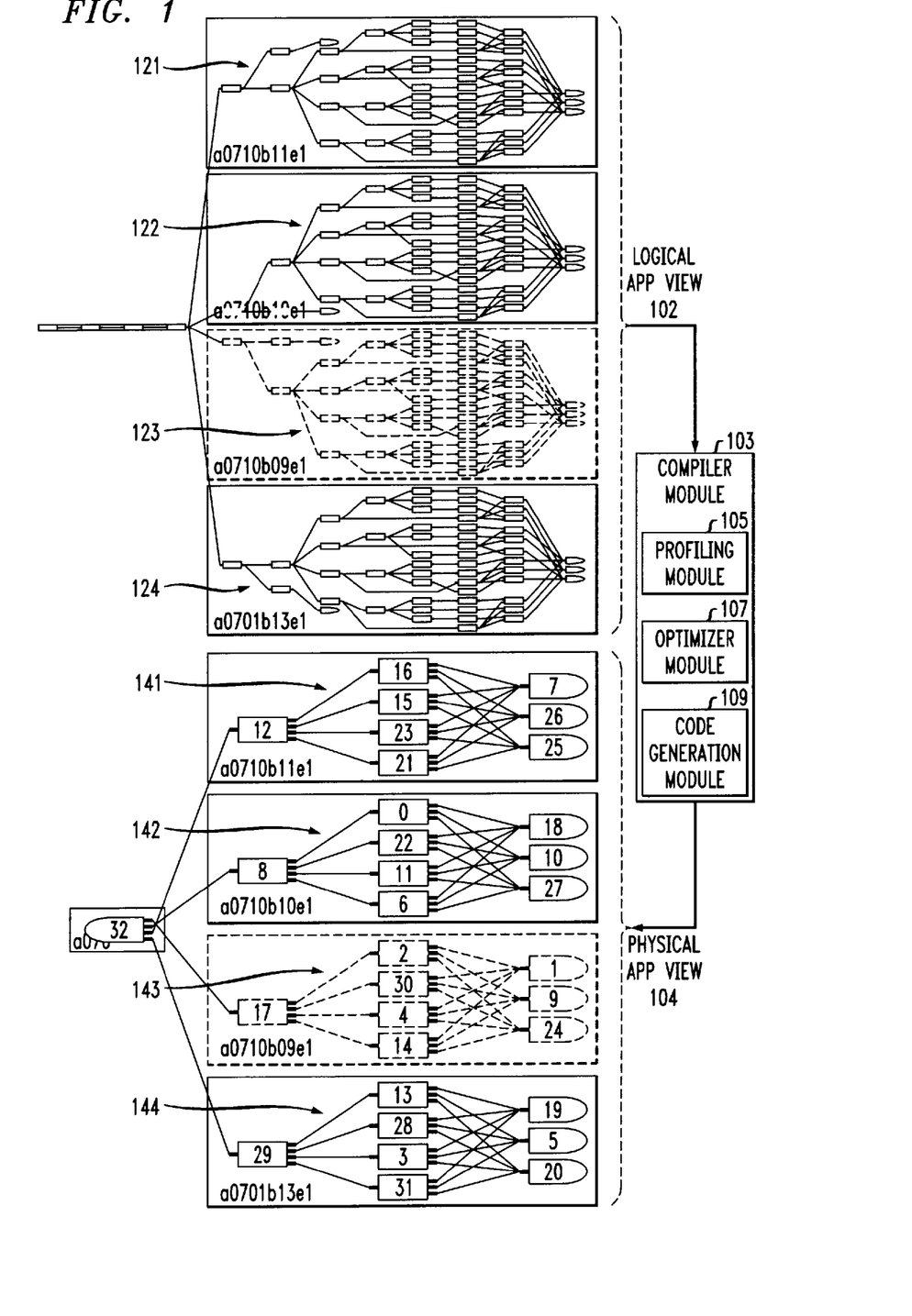
FIG. 1 is a diagram illustrating operator fusion with a programming language, according to an embodiment of the invention.

Data flow graphs can be deployed, for example, across the compute nodes of a stream processing platform cluster. The placement, scheduling, and other resource allocation decisions with respect to data flow graphs can be handled autonomically by the stream processing platform run-time, whereas they can also be influenced by the users through knobs exposed by the stream processing platform. FIG. 1 illustrates several concepts related to distributed stream processing and data flow graphs.

By way of example, a programming language such as SPADE is a rapid application development front-end for a stream processing platform, and includes a language, a compiler, and auxiliary support for building distributed stream processing applications to be deployed on the stream processing platform. SPADE can provide functionalities such as, for example, a language to compose parameterizable distributed stream processing applications in the form of data flow graphs. The operator logic can, for example, be implemented in another language, like C++, whereas the programming language can be used to compose these operators into logical data flow graphs.

The programming language compiler can also coalesce logical data-flow graphs into physical ones that are more appropriate for deployment on a given hardware configuration, from a performance point of view. This can be achieved by fusing several operators and creating bigger ones that fit in available compute nodes.

A programming language (for example, SPADE) can also provide a type-generic streaming operator model that can capture the fundamental concepts associated with streaming applications such as, for example, windows on input streams, aggregation functions on windows, output attribute assignments, punctuation markers in streams, etc. A programming language can also include a default toolkit of operators, referred to herein as the relational toolkit, which provides common operators that implement relational algebra-like operations in a streaming context.

Additionally, a programming language can provide support for extending the language with new type-generic, highly configurable, and reusable operators. This enables third parties to create application- or domain-specific toolkits of reusable operators.

From a flexibility point-of-view, one can define an application using fine-granular operators so that it can be flexibly deployed on different hardware configurations. Monolithic operators that are too big make it difficult to port an application from a small set of powerful nodes (such as, for example, a Blade server) to a large set of less powerful nodes (such as, for example, a BLUEGENE supercomputer from International Business Machines of Armonk, N.Y.), as it requires the manual process of re-factoring the user-code and is a significant burden on the developer. In embodiments, the programming language is focused on designing the application by reasoning about the smallest possible building blocks that are necessary to deliver the computation an application is supposed to perform.

FIG. 1 is a diagram illustrating operator fusion with a programming language, according to an embodiment of the invention. By way of illustration, FIG. 1 depicts a logical application view 102 and a physical application view 104, and a compiler 103. As you move from small scale systems to large scale systems, the mapping from the logical graph to the physical graph may change (for example, the physical graph could become larger when you have more nodes in the system). As depicted in FIG. 1, a logical application 102 is an application that includes a large number of operators, and a physical application 104 is an application that includes a smaller number of partitions.

FIG. 1 illustrates how the programming language's operator fusion mechanisms can be used to create PE-level physical data flow graphs out of operator-level logical data flow graphs and, as a result, make it possible to re-target applications to different hardware configurations without requiring any code re-factoring by the application developer. As shown in FIG. 1, compiler 103 includes a profiling module 105, an optimizer module 107 and a code generation module 109. Logical application 102 is embodied in source code and includes a plurality of operators, some of which are labeled 121, 122, 123 and 124. Physical application view 104 is embodied in executable code and contains execution containers, some of which are labeled 141, 142, 143 and 144.

In operation, compiler 103 compiles the source code 102 into executable code 104 and, in the process, groups operators into execution contains. For example, compiler 103 receives the source code for the stream processing application, profiling module 104 profiles the source code to determine characteristics of the operators, and code generation mode 109 generates executable code for the application. Profiling module 104 may cause code generation module 109 to inject profiling code into generated operators. The injected profiling code may be used to collect operator characteristics such as resource usage information during run-time. A grouping of operators into execution containers may then be performed by the optimizer module 107. Based on this grouping, code generation module 109 may then generate executable code 104 that has the operators, such as 121-124, grouped into execution units, such as 141-144. Each execution unit can then be executed in a partition. Characteristics that may be determined can include, for example, rates central processing unit (CPU) utilization, grouping (that is, matching the total resource usage of operators to those nodes in the system), etc.

From a performance point of view, the granularity of the PE-level graph sets the trade-off between making use of pipelined parallelism versus avoiding costly inter-process communication. For instance, at one extreme, it is undesirable from a performance standpoint to run 100 operators as 100 PEs on a single processor system, due to the excessive cost of tuple transfers between processes. On the other extreme, running 100 operators as a single PE on a multi-node configuration will make it impossible to take advantage of hardware parallelism that might be available (for example, from multi-core chips or multiple nodes). A more advantageous spot for optimization is the set of scenarios between these two extremes, where a healthy balance of fusion and pipelined parallelism is ideal in achieving high performance.

As an application gets larger, finding such a balance manually becomes increasingly difficult and necessitates automatic creation of PE-level data flow graphs. In one or more embodiments of the invention, the programming language's fusion optimizer can automatically determine an optimized partitioning of operators into PEs in order to maximize the performance for a given hardware configuration.

Another challenge in creating compiled stream processing applications is to understand the computation and communication characteristics of the operators that form a data flow graph. Without such information, it is almost impossible to make informed decisions in the compilation stage. The programming language compiler addresses this problem by generating instrumentation code under pro-filing mode, so that resource usage statistics of operators can be captured and fed into the optimizer. Further complicating matters, such statistical information could potentially be highly skewed is when the profiling is performed in a non-fused mode. As such, in one or more embodiments of the invention, the programming language's profiling framework is designed to be flexible enough to collect operator-level statistics under arbitrary fusion settings and with little run-time overhead.

As noted, the techniques described herein can include a profiling scheme to learn computation and communication characteristics of the operators in a data flow graph. In profiling mode, the programming language's compiler emits instrumentation code that not only collects these statistics with little run-time overhead, but also achieves that in a fusion-transparent manner. That is, the same level of information could be collected irrespective of how the application is fused.

In many cases, by way of example, applications created with a programming language (such as, for example, SPADE) can be long-running, continuous queries. As such, the long run-times can amortize the build costs. Nevertheless, the programming language compiler can support incremental compilation, reducing the build costs.

Programming languages such as, for example, SPADE, use code generation to fuse one or more operators into a PE. As detailed herein, PEs are units of node-level deployment in a stream processing platform, and a PE is a container for operators and runs as a separate process. At any given time, a running PE is tied to a compute node, although it can be relocated at a later time. Multiple PEs can be run on a given compute node, and a single multi-threaded PE can take advantage of different cores on the same compute node.

A PE generator can produce container code that performs functionalities such as the following. For example, container code can pop tuples from the PE input queues and send them to the operators within. Also, container code can receive tuples from operators within and push them into the PE output queues, as well as fuse the output ports of operators with the input ports of the downstream operators using function calls.

PEs have input and output ports, just like operators. In one or more embodiments of the invention, there is a one-to-one mapping between the PE-level ports and the exposed ports of the operators contained inside the PE. As such, an operator-level output port is exposed if and only if at least one of the following conditions are satisfied: i) the output port publishes into an input port that is part of an operator outside this PE; ii) the output port generates an exported stream. Streams can be exported by the application developer to enable other applications to dynamically tap into these streams at run-time. This can be used, for example, for incremental application deployment, where multiple applications can be brought up at different times yet can communicate with each other using dynamic stream connections.

Dually, in one or more embodiments of the invention, an input port is exposed if and only if at least one of the following conditions are satisfied: i) the input port subscribes to an output port that is part of an operator outside this PE, ii) the input port subscribes to an imported stream. Imported streams can have associated import specifications that describe the exported streams they are tapping into. An input port connected to an imported stream needs to be exposed at the PE level so that the dynamic stream connections can be established during run-time. Ports that are not exposed at the PE level are internal to the PE and are invisible to other PEs or applications.

Unlike operator ports, PE ports are attached to queues. This also points out a notable difference between PE-level and operator-level connections. Crossing a connection from a PE output port to a PE input port involves queuing/de-queuing, marshalling/un-marshalling, as well as inter-process communication. The latter can involve going through the network, in case PEs are located in different nodes. In contrast, connections between operator ports are implemented via function calls and thus are much cheaper compared to connections between PE ports.

Note that the fusion of operators with function calls can result in a depth-first traversal of the operator sub-graph that corresponds to the partition of operators associated with the PE, with no queuing involved in-between.

An operator container generated by a programming language is driven by a main PE thread. This thread checks all input queues for tuples, and when a tuple is available from a PE input port, it fetches the tuple and makes a call to the process function of the associated input port of the operator that will process the tuple. Depending on the details of the operator logic, the depth-first traversal can be shortcut in certain branches (for example, an operator filtering the tuple or buffering it without generating output tuples) or result in multiple sub-traversals (for example, an operator generating multiple output tuples). Such a design entails non-blocking behavior in process functions associated with the input ports of an operator.

As described herein, a programming language (such as, for example, SPADE) may support multi-threaded operators, in which case the depth-first traversal performed by the main PE thread will be cut short in certain branches and, more importantly, other threads will continue from those branches, independently. As such, the process functions associated with input ports of an operator can be executed concurrently, and, as a result, code for stateful operators can be written in a thread-safe manner. For user-defined operators, the programming language can generate code to automatically protect the process functions to provide thread-safety (as an optimization, such locks are not inserted into the code if an operator is not grouped together with other operators and is part of a singleton PE). As an alternative, in one or more embodiments of the invention, finer grained locking mechanisms can be employed by the operator developers.

PEs can contain any type of operators, including source operators. A source operator is different in the sense that its processing is not triggered by the arrival of an input tuple. Additionally, source operators can have their own driver process functions. As a result, programming language-generated PE containers can start a separate thread for each source operator within the PE. A source operator thread will call the source operator's process function, which will drive the processing chain rooted at the source operator. The source operator will not release the control back to the calling context until termination.

Because programming languages support feedback loops in the data-flow graph, an operator graph is not necessarily cycle-free, opening up the possibility of infinite looping on a cycle within a composite PE (which will result in running out of stack space). As such, one or more embodiments of the invention enable user-defined operators to tune their logic based on feedback from downstream operators (for example, by refining a classification model). Under operator fusion, a programming language expects feedback links to be connected to non-tuple-generating inputs. This guarantees cycle-free execution under operator fusion. However, in one or more embodiments of the invention, it is the developer's responsibility to ensure that the feedback links are not connected to tuple-generating inputs.

Figure 2:
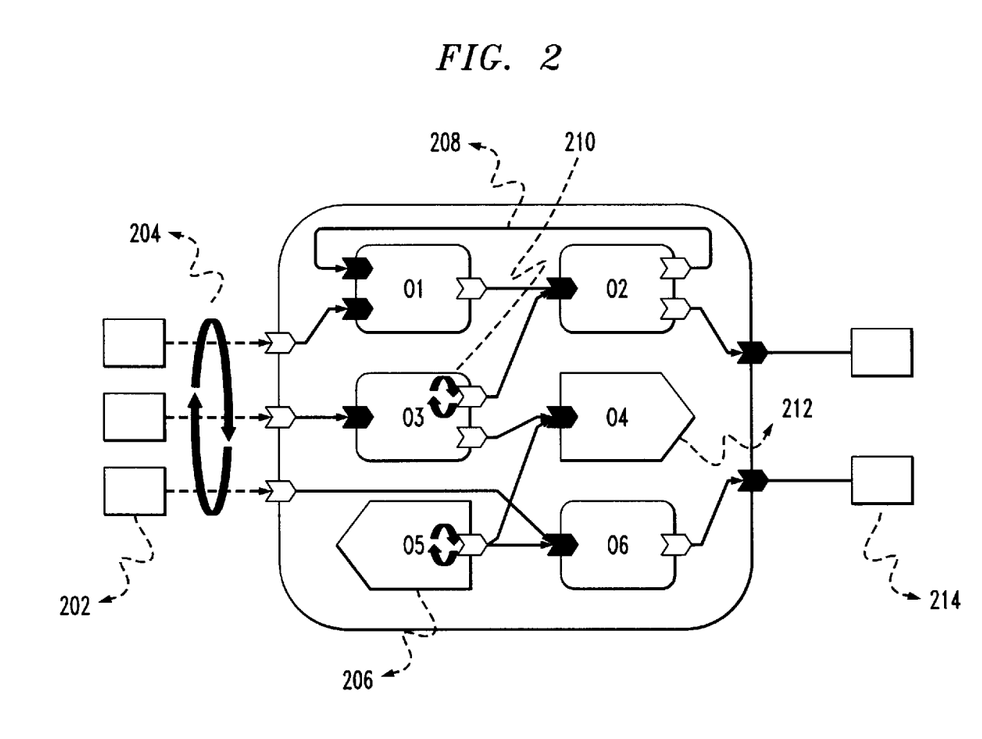
FIG. 2 is a diagram illustrating an exemplary programming language container with fusion, according to an embodiment of the invention.

FIG. 2 is a diagram illustrating an exemplary programming language container with fusion, according to an embodiment of the invention. By way of illustration, FIG. 2 depicts input queues 202, a main PE thread 204 (that drives all of the inputs), a source operator 206 (that is always driven by a separate thread), a feedback loop 208 and a multi-threaded operator 210. FIG. 2 also depicts a sink operator 212 and output queues 214.

As noted, FIG. 2 depicts a PE generated via fusion of six operators. As illustrated, source operator O5 has its own thread, and O3 is a multithreaded operator with its first output port driven by its additional thread. Note also that the operators O1, O2, O4 and O6 are subject to execution under more than one thread. This particular exemplary PE has three threads in total.

One or more embodiments of the invention include using a powerful profiling framework for effective optimization. As such, SPADE's compiler-based optimization can be driven by automatic pro-filing and learning of application characteristics.

A programming language's profiling framework can include components such as, for example, code instrumentation, statistics collection, and statistics refinement. Code instrumentation can be used at compile-time to inject profiling instructions into the generated spade processing elements. Statistics collection is a run-time process of executing those instructions to collect raw statistics regarding communication and computation characteristics of operators. Statistics refinement involves post-processing these raw statistics to create refined statistics that are suitable for consumption by the fusion optimizer.

In one or more embodiments of the invention, the profiling framework is designed around the following goals such as, for example, collecting statistics at the operator/port level, having fusion transparent profiling infrastructure, and having profiled applications that do not suffer from the observer effect.

Collecting statistics at the operator/port level enables the fusion optimizer to reason about different fusion strategies, because PE level statistics can be computed by composing operator level ones. Fusion transparency provides the flexibility to collect the same type of statistics regardless of the fusion mode. This also enables performance of multiple profile/optimize/re-fuse steps to further revise the fusion strategy. Additionally, in one or more embodiments of the invention, the profiling performed by the programming language is light-weight so as not to change the application behavior under instrumentation.

A programming language (such as, for example, SPADE) can instrument the generated containers using submit signals. For each operator-level output port in the container, there is one submit signal which keeps a list of all of the calls to the process functions of the downstream operator inputs subscribed to the output port. There can also be a submit signal for each PE level input port. Submit signals are used as instrumentation points, and are used to collect the following port-level metrics:

1) Number of tuples seen by an input/output port;
2) Size of tuples seen by an input/output port;
3) Central processing unit (CPU) time taken to submit a tuple via an output port; and
4) CPU time taken to process a tuple received by an input port.

In order to measure CPU time it takes to perform a submit call, the programming language can start a timer when it receives a tuple at the submit signal and stop the timer when all of the calls to the process functions are completed. In one or more embodiments of the invention, the programming language can also start similar timers for each process function call attached to the submit call. For instance, in FIG. 3, the submit signal contains two process calls and, as a result, employs three timers: one for the submit call as a whole, and one for each of the process calls. These timers are implemented using CPU counters.

Figure 3:
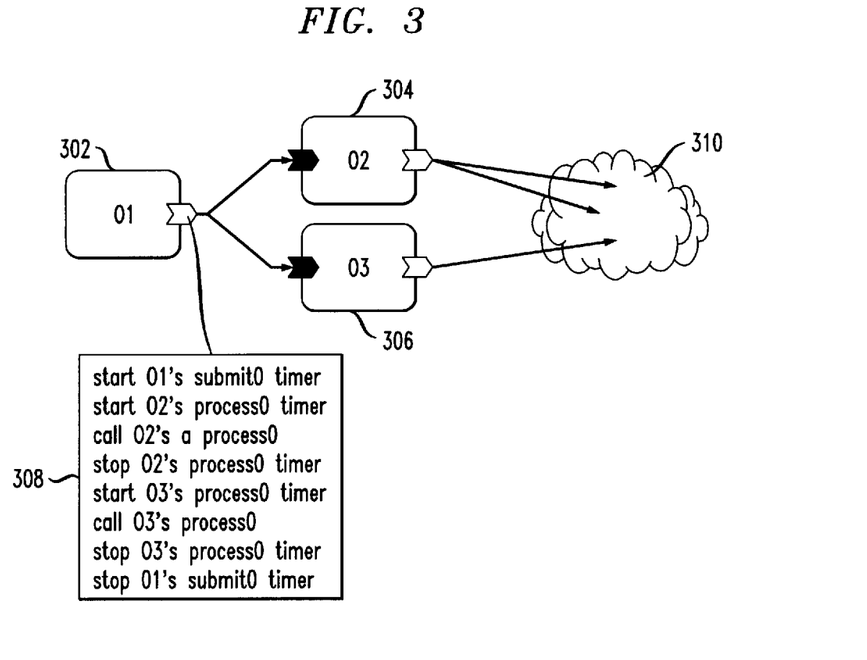
FIG. 3 is a diagram illustrating exemplary instrumented processing element (PE) containers, according to an embodiment of the invention.

FIG. 3 is a diagram illustrating exemplary instrumented PE containers, according to an embodiment of the invention. By way of illustration, FIG. 3 depicts operator 1 (O1) 302, operator 2 (O2) 304, operator 3 (O3) 306, the series of calls that are being made to profile this particular topology of operators 308 and the downstream operators in the graph 310 (shown as a cloud as their specific topology is not of interest).

In one or more embodiments of the invention, the programming language also maintains a separate base CPU time metric for each thread in the container, other than the main PE thread.

Further, for each metric collected at a submit signal, the programming language can maintain a number of samples. For example, one can have several values representing CPU time taken to submit on an output port, each for a different tuple. These values are time-stamped to identify them uniquely. As a result, statistical summaries can be computed from these metrics.

Additionally, a programming language can use two techniques to reduce the computation and memory overhead of profiling, namely, stride-sampling and reservoir-sampling. Stride sampling is used to decide for which tuples one wants to collect metrics. A sampling fraction of s ∈ (0, 1] will result in collecting metrics once in every [1/s] tuples. For these tuples, one can collect metrics; but because one cannot keep all metrics in memory in a streaming system, one can use a reservoir sampling approach to decide which metrics to keep. With reservoir sampling, each metric value collected has an equal chance of ending up in the reservoir. A reservoir size of S, for example, can be used to limit the memory overhead. The reservoir sampling techniques works as follows.

Given a new value, which is the ith one so far (i≥0), perform the following action: If i<S, add the new value into the reservoir, else (i>=S) with probability S/I, replace a random item from the reservoir with the new value (drop it with probability 1−S/i).

Note that the stride sampling reduces the computation overhead, whereas the reservoir sampling reduces the memory overhead of profiling. For instance, with s=0.001 and S=500, one will collect metrics once in every 1000 tuples and one will only keep a random subset of 500 values from the metric values collected so far.

Recall also that one of the goals of profiling is to collect metrics at the operator/port level. Fusion can make this task challenging, because the CPU time for processing a tuple on a given input port not only counts the amount of time spent executing the associated operator's logic, but also any downstream processing that may take place. For instance, FIG. 4 depicts one possible execution flow and the associated submit and process times.

Figure 4:
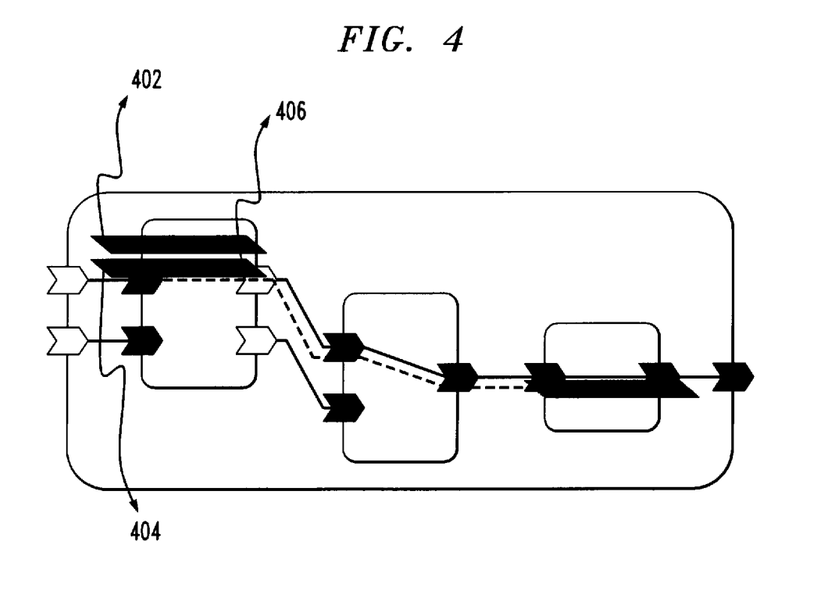
FIG. 4 is a diagram illustrating an exemplary execution flow, according to an embodiment of the invention.

As noted, FIG. 4 is a diagram illustrating an exemplary execution flow, according to an embodiment of the invention. By way of illustration, FIG. 4 depicts process time—submit time 402, process time 404 and submit time 406. With respect to process time—submit time 402, for a given input port, process time is the time it takes to service a tuple received on that port (this may involve traversing downstream operators). Also, for a given output port, submit time is the time it takes to submit a tuple on that port (the submit call may traverse the downstream operators).

FIG. 4 illustrates separating out operator statistics. One can collect samples in a variety of ways. For example, one can collect samples per input port via in-tuple rate, tuples/sec and bytes/sec, as well as via processing time (which includes all fused downstream operators). Additionally, one can collect samples per output port via out-tuple rate, tuples/sec and bytes/sec, as well as via submit time (which includes all fused downstream operators). One can also collect samples per operator via processing time (due to processing other than port-triggered processing, such as work done by additional operator threads).

In one or more embodiments of the invention, one can extract the time spent for executing the operator logic by subtracting the time spent on downstream processing on a given output port, called submit time, from the total time measured for the process call at the input port, called process time. However, this may not be possible without very heavy instrumentation, because the execution flow following a process call on an input port is operator logic dependent. For instance, the tuple processing may result in zero or more submit calls on one or more output ports. Without tracking which submit calls are triggered by which process calls, it is impossible to compute the CPU time spent within a given operator's scope on a per-port basis. Multi-threading further complicates the situation.

Fortunately, one can compute the average amount of CPU time spent by an operator by refining the raw metric values, as described herein. Also, one or more embodiments of the invention include performing a post-processing step after raw metric values are collected during a profiling run to create the following refined statistics.

One can post-process collected data to refine statistics such as, for example, for each operator, computing the average amount of CPU resources it demands (for example, cpuFrac or MIPS) and, for each port (input/output), computing mean data rates. Also, in one or more embodiments of the invention, the post-processed data is accessible to third parties through OO Perl application programming interfaces (APIs), wherein one can traverse the topology and query statistics. The raw samples are also available.

Also, with respect to data transfer rate, for each input (output) port, one can compute the rate in bytes/sec, denoted by $r_i^\triangleleft$ ($r_i^\triangleright$) for the ith input (output) port. Similarly, one can compute the rate in tuples/sec, denoted by $c_i^\triangleleft$ ($c_i^\triangleright$) for ith input (output) port. For CPU fraction, for each operator, one can compute the fraction of CPU it utilizes, denoted by u ∈ [0,N], where N is the number of CPUs on a node. As described herein, the CPU fraction is computed by aggregating the process and submit-time metric values.

By way of example, assume one denotes the CPU time spent on processing a tuple on ith input port as $t_i^\triangleleft$ and similarly, CPU time spent on submitting a tuple on ith output port as $t_i^\triangleright$. Let k denote the number of input ports, and l denote the number of output ports. Recalling that an operator can have additional threads, m of them in the general case, one can also denote the CPU fraction taken up by the ith thread as bi, which can be trivially computed using the base CPU time metric (detailed herein) and the associated timestamps.

Additionally, one can compute the CPU fraction u for an operator at hand, as follows:

$$u = \sum_{i=1}^{m} b_i + \sum_{i=1}^{k} c_i^{\triangleleft} \cdot t_i^{\triangleleft} - \sum_{i=1}^{l} c_i^{\triangleright} \cdot t_i^{\triangleright} \quad (1)$$

Equation 1 is interpreted as follows. First, one adds up the fraction of the CPU used by any threads that the operator might have. Then, for each input port, one adds the fraction of the CPU spent for executing the associated process calls. Finally, for each output port, one subtracts the fraction of the CPU spent for executing the associated submit calls. The former is approximated by $c_i^{\triangleleft} \bullet t_i^{\triangleleft}$ for the ith input port. $c_i^{\triangleleft}$ is the number of tuples processed within a second, whereas $t_i^{\triangleleft}$ is the average CPU time in seconds, spent for executing a process call. This average is computed using the N metric values that were stored in the reservoir during the profiling run. The fraction of the CPU spent for executing submit calls is computed similarly ($c_i^{\triangleright} \bullet t_i^{\triangleright}$ for ith output port).

Figure 5:
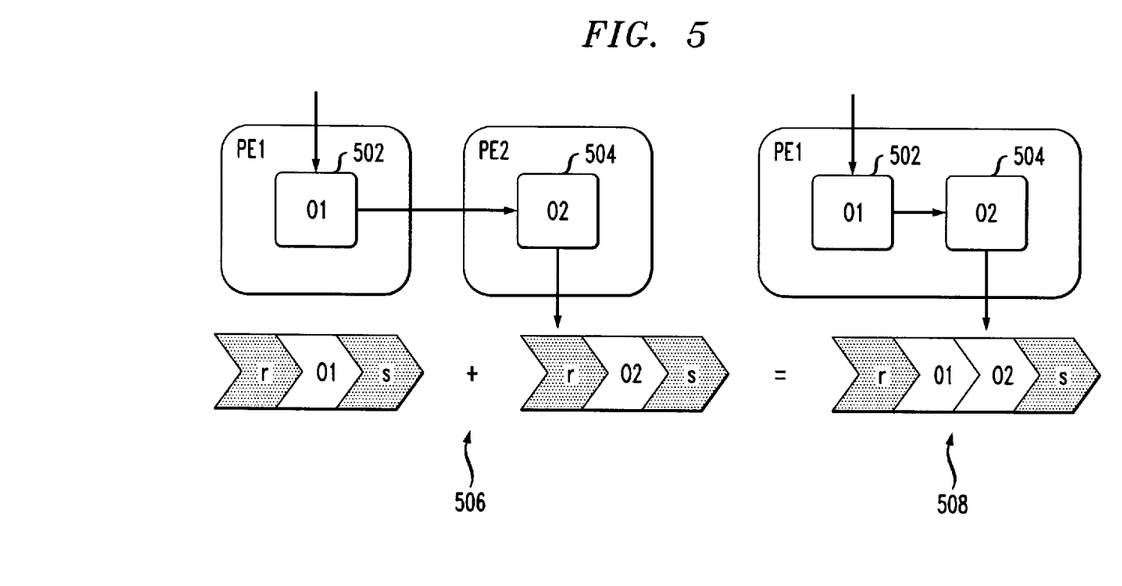
FIG. 5 is a diagram illustrating exemplary fusion cost depictions, according to an embodiment of the invention.

One or more embodiments of the invention also include using container-level statistics. The fusion optimizer also needs to know about the cost of sending and receiving tuples at the PE boundaries. Consider a simple scenario depicted in FIG. 5. FIG. 5 is a diagram illustrating exemplary fusion cost depictions, according to an embodiment of the invention. By way of illustration, FIG. 5 depicts two operators, O1 502 and O2 504, connected via a stream, and two alternative fusion strategies are considered: two separate PEs 506 versus a single composite PE 508.

For brevity, assume that these operators have a selectivity of 1 and do not change the size of the tuple as they propagate it. In the first alternative, the cost of processing a tuple is equal to the cost of receiving a tuple, executing the operator logic, and sending it. That is, Cr+C(O1)+Cs for operator O1 and Cr+C(O2)+Cs for operator O2. However, when one sums up these costs, one overestimates the cost of the second alternative, because the actual cost for the latter is Cr+C(O1)+C(O2)+Cs, assuming that the cost of a function call is negligible compared to Cr, Cs, C(O1), and C(O2).

As such, the fusion optimizer needs to know about the processing cost involved in sending and receiving tuples to reason about the cost of different fusion strategies. Note also that the cost of sending and receiving tuples mostly depends on the rate at which the tuples are being sent and/or received, as well as their sizes. As a result, the programming language maintains an application-independent mapping of 〈rate (tuples/sec), tuple size (bytes)〉 pairs to CPU fraction mapping (v: $\Re^+ \times \aleph^+ \rightarrow [0,N]$), which is used for all applications. This mapping needs to be re-adjusted only when the hardware changes.

One goal of fusion compilation includes coming up with a PE-level data flow graph using the statistics collected as part of the profiling step about the communication and computation characteristics of the operators, as well as the application-independent statistics regarding the cost of sending and receiving tuples at the PE boundaries. Deployment of the resulting PE-level data flow graph should provide better throughput, compared to the naïve approaches of creating one PE per operator or fusing all operators into one PE, and, more importantly, compared to manual fusion done by application designers (which is only practical for small-scale applications).

By way of example, let o={O1, ..., On} denote the set of operators in the data flow graph. One goal is to create a partitioning, that is, a set of partitions ρ={P1, ..., Pm}, where each partition is a set of operators ($P_i \subset o, \forall \rho_i \in \rho$), such that this partitioning is non-overlapping ($\forall_{i \neq j \in [1 \ldots m]}, P_i \cap P_j = \emptyset$) and covering ($\cup_{i \in [1 \ldots m]} P_i = o$). Each partition represents a container PE to be generated by the programming language compiler, as described herein.

There are constraints in creating the partitioning ρ. For example, the total CPU fraction used by a partition should not exceed a system specified threshold (for example, MaxFrac). By way of example, denote the computational load of a partition $P_i$ by CompLoad($P_i$), where:

CompLoad($P_i$)=OperLoad($P_i$)+CommLoad($P_i$).

OperLoad represents the computational load due to executing the operators within a single PE, that is:

$$CompLoad(P_i) = \sum_{O_j \in P_i} u(O_j).$$

$u(O_j)$ is the CPU fraction used by operator $O_j$, as detailed herein. CommLoad represents the communication load incurred due to sending and receiving tuples at the PE boundaries, which is computed using rates, tuple sizes, and the container-level statistics. Let Rate($P_i$) be the inter-PE communication rate for partition $P_i$, and Size($P_i$) be the average tuple size. Using the mapping v (as described herein), one can compute:

CommLoad($P_i$)=v(Rate($P_i$), Size($P_i$)).

A partition can be referred to as saturated iff its computational load is above MaxFrac, that is:

Saturated($P_i$)≡CompLoad($P_i$)>MaxFrac.

With these definitions, one can represent the first constraint as:

(saturation constraint) $\forall_{P_i \in P}, \neg$ Saturated($P_i$).

In one or more embodiments of the invention, one can set MaxFrac to a value smaller than 1 in order to leave enough slack for the scheduler to dynamically adjust PE placements and CPU allocations during run-time, in response to changes in the workload.

Also, the ratio of CPU load due to executing the operator logic within a partition, compared to the overall CPU load for the partition, referred to as the effective utilization and denoted by EffectiveUtil, should be greater than or equal to a threshold (for example, MinUtil). This limits the overhead of inter-PE communication. For instance, if a partition contains a single operator that performs very little work on a per-tuple basis, the time spent by the PE container for receiving and sending tuples will constitute a significant portion of the overall CPU load, resulting in a small EffectiveUtil value, which is undesirable. Formally:

$$EffectiveUtil(P_i) = \frac{OperLoad(P_i)}{OperLoad(P_i) + CommLoad(P_i)}.$$

A partition can be referred to as underutilized if its effective utilization is below MinUtil, that is:

Underutilized($P_i$)≡EffectiveUtil($P_i$)<MinUtil.

In one or more embodiments of the invention, there should be no underutilized partitions. Formally:

(utilization constraint) $\forall_{P_i \in P}, \neg \text{Underutilized}(P_i)$.

Additionally, among solutions that satisfy the saturation and utilization constraints, one or more embodiments of the invention include using the one that minimizes inter-PE communication. In other words, the compilation goal is to minimize the objective function $$\sum_{P_i \in \rho} \text{Rate}(P_i).$$

Further, as described herein, the programming language employs a technique referred to herein as GreedyFuse to create operator partitions. This greedy technique starts with a partitioning where each operator is assigned to a different partition. At each greedy step, one can create a set of candidate merges, where a merge involves fusing two of the existing partitions into a new, bigger one. Each candidate merge is assigned a merge benefit, and the one with the highest benefit is applied to complete the greedy step. The technique can continue until no candidate merges are available.

In order to create the candidates for merging, a programming language fusion optimizer considers all pairs of underutilized partitions, but filters the pairs that are not connected to each other or would violate the saturation constraint when merged. Formally, Mergable($P_i$, $P_j$)≡i≠j ∧ Connected($P_i$, $P_j$) ∧ ¬ Saturated($P_i \cup P_j$)

∧ Underutilized($P_i$) ∧ Underutilized($P_j$).

Note that at each greedy step, an effort is made to remove underutilized partitions. Also, the merge benefit is computed as the amount of inter-PE communication saved by merging two partitions, so that each greedy step reduces the objective function to be minimized as much as possible. Formally, MergeBenefit($P_i$, $P_j$)=Rate($P_i$)+Rate($P_j$)−Rate($P_i \cup P_j$).

Because the merged partitions must be connected by at least one link, each greedy step reduces the aggregate inter-PE communication, unless the rate of communication between the merged partitions is equal to zero. Technique 1, shown below, gives a summary of the GreedyFuse technique.

---
Technique 1:
GreedyFuse(o)
---
(1)  $\rho \leftarrow \{P_i : P_i = \{O_i\} \wedge O_i \in o\}$
(2)  while true
(3)    $\rho^c \leftarrow \{\{P_i, P_j\} \subset \rho : \text{Mergable}(P_i, P_j)\}$
(4)    if $\rho^c = 0$ then break
(5)    $\{P_i, P_j\} \leftarrow \underset{\{P_i, P_j\} \in P^c}{\arg\max} \text{MergeBenefit}(P_i, P_j)$
(6)    $P_i \leftarrow P_i \cup P_j; \rho \leftarrow \rho - \{\rho_j\}$
(7)  Label partitions in $\rho$, as $P_1, \ldots, P_m$
---

A programming language's fusion optimizer also performs the placement of PEs to compute nodes. As such, one or more embodiments of the invention use a form of clustering (PEs into nodes) with the goal of minimizing inter-node communication.

As described herein, one or more embodiments of the invention include compiling stream processing applications (distributed data stream processing applications and/or a non-distributed data stream processing applications in a multi-core system); that is, finding an effective and flexible way of mapping the logical graph of operators into a physical one that can be deployed on a set of nodes. Using stream-centric and operator-based programming language (for example, SPADE) and its code-generating compiler, one or more embodiments of the invention rely on a two-staged compilation framework. First, an instrumented version of the application is generated in order to profile and learn about the computation and communication characteristics of the application. Next, this profiling information is fed to a fusion optimizer that comes up with a physical data flow graph, which is deployable on the stream processing platform distributed run-time and is optimized to strike a balance between taking advantage of parallelism and avoiding costly inter-process communication.

Figure 6:
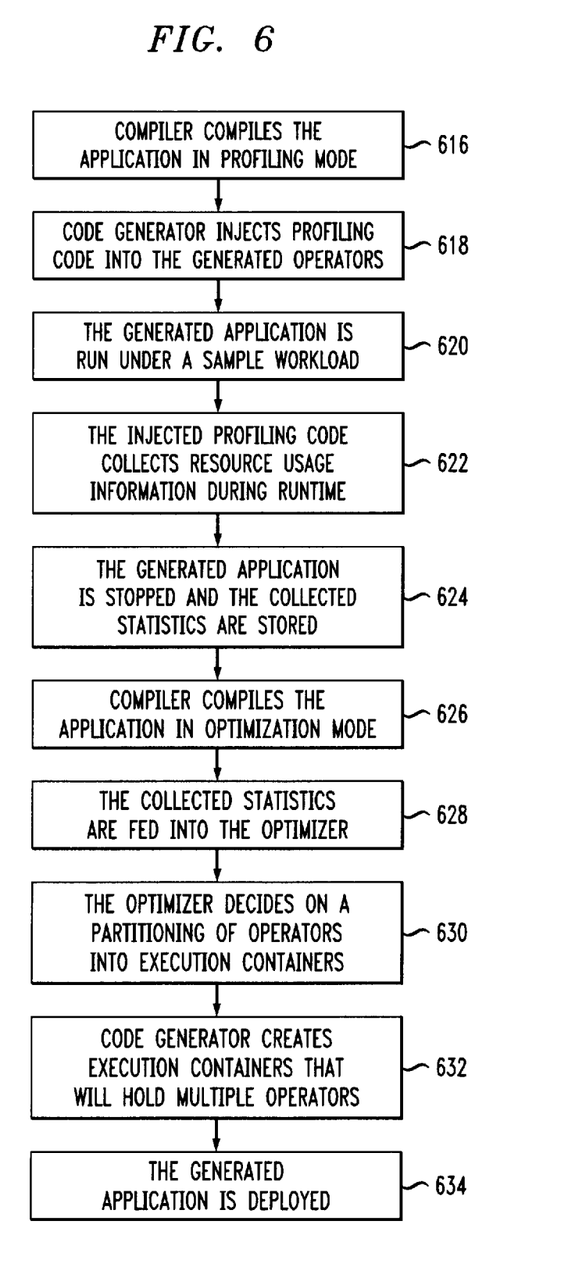
FIG. 6 is a diagram of an exemplary embodiment, according to an aspect of the invention.

FIG. 6 is a diagram illustrating an exemplary embodiment, according to an aspect of the invention. By way of illustration, FIG. 6 illustrates various steps as follows. Step 616 includes compiling an application in profiling mode, a step that can be performed by the compiler module 103 illustrated in FIG. 1. Step 618 includes injecting profiling code into generated operators, a step that can be performed by the code generation module 109 illustrated in FIG. 1. Step 620 includes running the generated application under a sample workload. Step 622 includes using the injected profiling code to collect resource usage information during run-time, a step that can be performed by the code generated by profiling module 105 illustrated in FIG. 1.

Step 624 includes stopping the generated application and storing the statistics. Further, step 626 includes compiling the application into optimization mode, a step that can be performed by the compiler module 103 illustrated in FIG. 1. Step 628 includes feeding the collected statistics into the optimizer module 107 illustrated in FIG. 1. Step 630 includes deciding on a partitioning of operators into execution containers, a step that can be performed by the optimizer module 107 illustrated in FIG. 1.

Additionally, step 632 includes creating execution containers that will hold multiple operators, a step that can be performed by the code generation module 109 illustrated in FIG. 1. Also, step 634 includes deploying the generated application which includes execution containers (for example, 141-144 as illustrated in FIG. 1) that further include operators.

Figure 7:
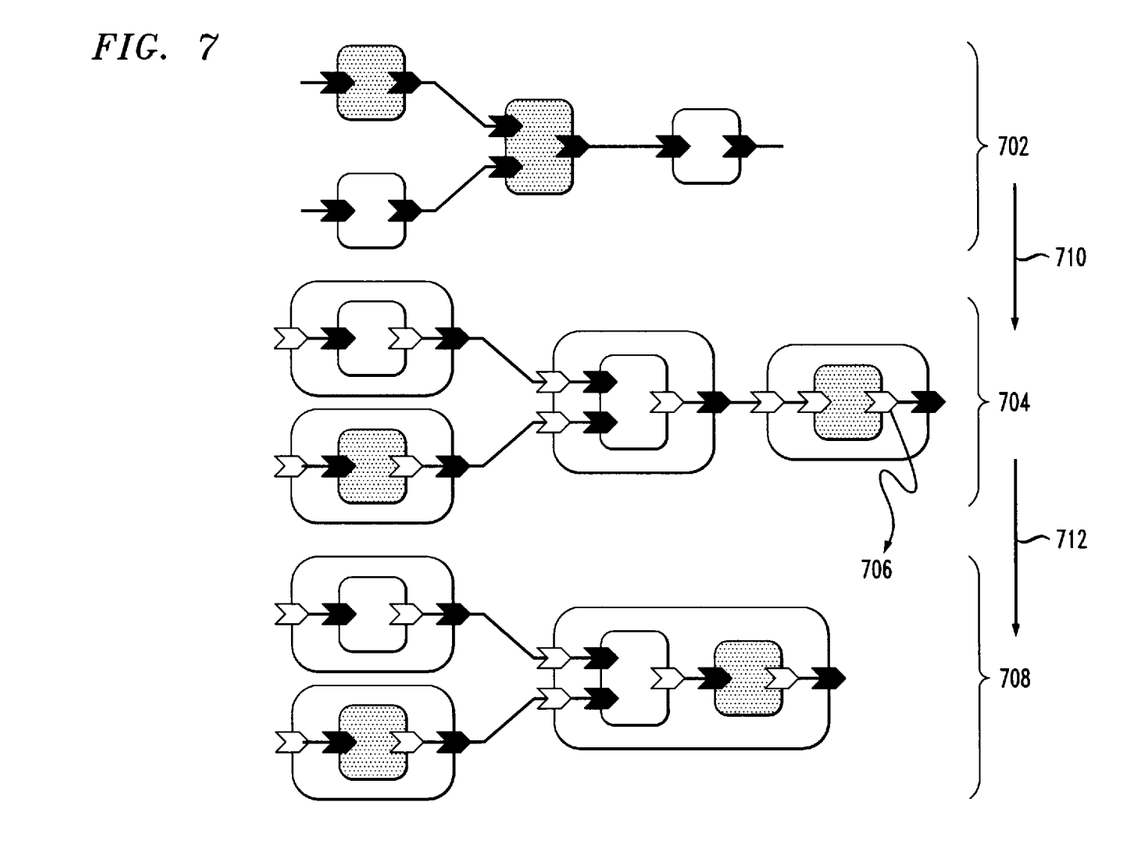
FIG. 7 is a diagram illustrating compiling a data stream processing application, according to an embodiment of the invention.

FIG. 7 is a diagram illustrating compiling a data stream processing application, according to an embodiment of the invention. FIG. 7 depicts both components and technique steps. Specifically, FIG. 7 depicts an application 702, an application with profiling hooks 704 (implemented by one or more embodiments of the invention), including a signal object 706 encapsulating instrumentation, and the application 708 after the compilation processing of one or more embodiments of the invention have been performed upon it. Additionally, as illustrated in FIG. 7, step 710 includes adding profiling code to the application 702 and compiling, and step 712 includes profiling the application (with profiling hooks) 704, partitioning and compiling the application to provide application 708 as an output.

Figure 8:
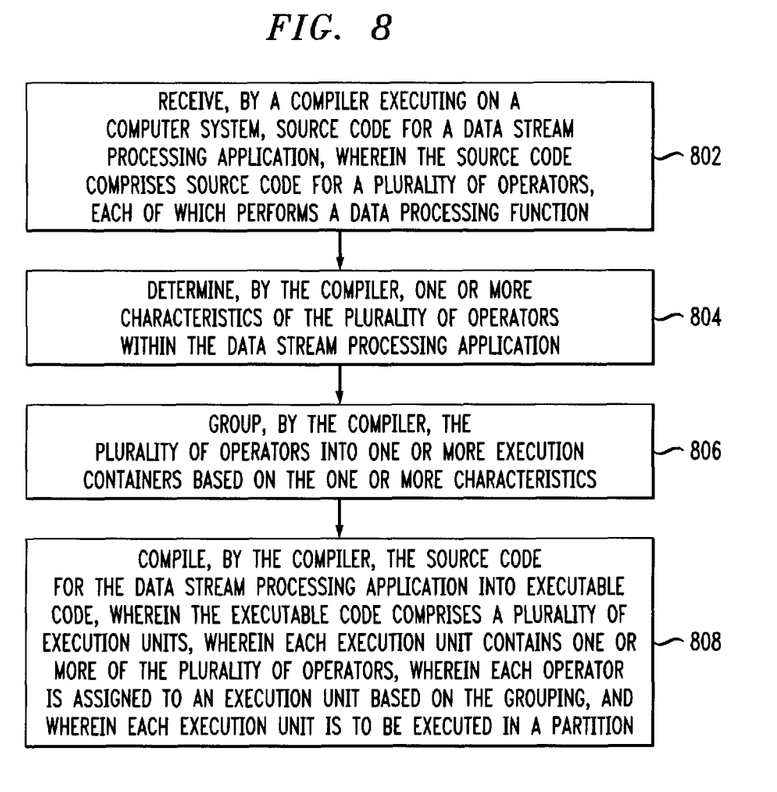
FIG. 8 is a flow diagram illustrating techniques for compiling a data stream processing application, according to an embodiment of the invention.

FIG. 8 is a flow diagram illustrating techniques for compiling a data stream processing application (for example a distributed data stream processing application and/or a non-distributed data stream processing application in a multi-core system), according to an embodiment of the present invention. Step 802 includes receiving, by a compiler executing on a computer system, source code for a data stream processing application, wherein the source code comprises source code for a plurality of operators, each of which performs a data processing function.

Step 804 includes determining, by the compiler, one or more characteristics of the plurality of operators within the data stream processing application. This step can be carried out, for example, using a profiling module. The characteristics can include, by way of example, computation and/or communication characteristics. Determining one or more characteristics of the plurality of operators within a data stream processing application can include, for example, generating an instrumented version of the application, injecting profiling code into the instrumented version of the application, running the application under a sample workload, and using the profiling code to collect the one or more characteristics of the operators. One or more embodiments of the invention can also include using performance modeling to determine such characteristics.

Step 806 includes grouping, by the compiler, the plurality of operators into one or more execution containers based on the one or more characteristics. Step 808 includes compiling, by the compiler, the source code for the data stream processing application into executable code (for example, code that can be loaded into the memory of a machine and run via native instructions), wherein the executable code comprises a plurality of execution units, wherein each execution unit contains one or more of the plurality of operators, wherein each operator is assigned to an execution unit based on the grouping, and wherein each execution unit is to be executed in a partition (that is, executing in the same process, wherein each partition maps to a process).

Partitioning or grouping can also include, for example, creating a set of partitions formed by breaking-down an operator graph into multiple pieces. This step can be carried out, for example, using an optimizer module. Compiling the source code for the data stream processing application into executable code can include fusing the plurality of operators until overhead of one or more tuple transfers is a pre-determined fraction of total cost of executing all operator logic within an execution container.

Additionally, the techniques depicted in FIG. 8 can include outputting compiled source code, wherein the compiled source code comprises one or more operators fused into one or more partitions.

The techniques depicted in FIG. 8 can also include, as described herein, providing a system, wherein the system includes distinct software modules (for example, a profiling module, an optimizer module, a code generation module and/or a compiler module executing on a hardware processor), each of the distinct software modules being embodied on a tangible computer-readable recordable storage medium. For example, one or more embodiments of the invention include creating one or more containers that map a data flow graph of one or more data stream operators into a set of one or more executables that are deployable across a set of nodes (for example distributed and/or non-distributed nodes in a multi-core system). This step can be carried out, for example, using a code generation module. Additionally, creating containers can include creating containers that fuse one or more operators such that stream connections between the operators within the same container are reduced to function calls.

One or more embodiments of the invention can also include generating an instrumented version of the application to determine the one or more characteristics of the one or more operators within a data stream processing application. This step can be carried out, for example, using a compile module. Further, the techniques described herein can include re-targeting the application to a different hardware setup by compiling the application to match a physical flow graph (for example, one produced by the optimizer). This step can be carried out, for example, using the optimizer module.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 9:
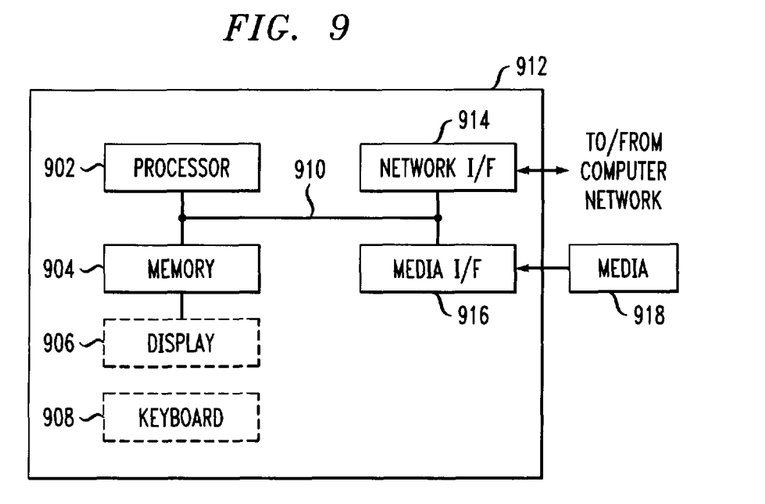
FIG. 9 is a system diagram of an exemplary computer system on which at least one embodiment of the invention can be implemented.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 918) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 904), magnetic tape, a removable computer diskette (for example media 918), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 7. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, creating highly optimized applications that are tailored to the underlying computing and networking infrastructure.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for compiling a data stream processing application, wherein the method comprises:
   receiving, by a compiler executing on a computer system, source code for a data stream processing application, wherein the source code comprises source code for a plurality of operators, each of which performs a data processing function;
   determining, by the compiler, one or more characteristics of the plurality of operators within the data stream processing application, wherein said determining comprises:
   injecting profiling code into an instrumented version of the data stream processing application;
   running the data stream processing application under a sample workload;
   using the profiling code to collect one or more computation and communication characteristics of the plurality of operators within the data stream processing application; and
   processing the one or more collected computation and communication characteristics to compute (i), for each of the plurality of operators, an average amount of demanded processing resources and, (ii) for each port of the plurality of operators, a mean data rate;
   grouping, by the compiler, the plurality of operators into one or more execution containers based on the average amount of demanded processing resources and the mean data rate computations; and
   compiling, by the compiler, the source code for the data stream processing application into executable code, wherein the executable code comprises a plurality of execution units, wherein each execution unit contains one or more of the plurality of operators, wherein each operator is assigned to an execution unit based on the grouping, and wherein each execution unit is to be executed in a partition.

2. The method of claim 1, wherein:
   compiling the source code for the data stream processing application into executable code comprises fusing the plurality of operators until overhead of one or more tuple transfers is a pre-determined fraction of total cost of executing all operator logic within an execution container.

3. The method of claim 1, further comprising creating one or more containers that map a data flow graph of one or more data stream operators into a set of one or more executables that are deployable across a set of nodes.

4. The method of claim 3, wherein creating one or more containers comprises creating one or more containers that fuse one or more operators such that one or more stream connections between the one or more operators within the same container are reduced to one or more function calls.

5. The method of claim 1, further comprising re-targeting the application to a different hardware setup by compiling the application to match a physical flow graph.

6. The method of claim 1, further comprising outputting compiled source code, wherein the compiled source code comprises one or more operators fused into one or more partitions.

7. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a profiling module, an optimizer module, a code generation module and a compiler module executing on a hardware processor.

8. A computer program product comprising a non-transitory tangible computer readable recordable storage device including computer useable program code for compiling a data stream processing application, wherein the computer usable program code comprises one or more distinct software modules, the computer program product including:
   computer useable program code for receiving, by a compiler executing on a computer system, source code for a data stream processing application, wherein the source code comprises source code for a plurality of operators, each of which performs a data processing function;
   computer useable program code for determining, by the compiler, one or more characteristics of the plurality of operators within the data stream processing application, wherein said determining comprises:
   injecting profiling code into an instrumented version of the data stream processing application;
   running the data stream processing application under a sample workload;
   using the profiling code to collect one or more computation and communication characteristics of the plurality of operators within the data stream processing application; and
   processing the one or more collected computation and communication characteristics to compute (i), for each of the plurality of operators, an average amount of demanded processing resources and, (ii) for each port of the plurality of operators, a mean data rate;
   computer useable program code for grouping, by the compiler, the plurality of operators into one or more execution containers based on the average amount of demanded processing resources and the mean data rate computations; and
   computer useable program code for compiling, by the compiler, the source code for the data stream processing application into executable code, wherein the executable code comprises a plurality of execution units, wherein each execution unit contains one or more of the plurality of operators, wherein each operator is assigned to an execution unit based on the grouping, and wherein each execution unit is to be executed in a partition.

9. The computer program product of claim 8, wherein the computer useable program code for compiling the source code for the data stream processing application into executable code comprises computer useable program code for fusing the plurality of operators until overhead of one or more tuple transfers is a pre-determined fraction of total cost of executing all operator logic within an execution container.

10. The computer program product of claim 8, further comprising:
   computer useable program code for outputting compiled source code, wherein the compiled source code comprises one or more operators fused into one or more partitions.

11. The computer program product of claim 8, further comprising:
   computer useable program code for creating one or more containers that map a data flow graph of one or more data stream operators into a set of one or more executables that are deployable across a set of nodes.

12. The computer program product of claim 11, wherein the computer useable program code for creating one or more containers comprises computer useable program code for creating one or more containers that fuse one or more operators such that one or more stream connections between the one or more operators within the same container are reduced to one or more function calls.

13. The computer program product of claim 8, wherein the one or more distinct software modules comprise a profiling module, an optimizer module, a code generation module and a compiler module executing on a hardware processor.

14. A system for compiling a data stream processing application, comprising:
   a memory; and
   at least one processor coupled to the memory and operative to:
      receive, by a compiler executing on a computer system, source code for a data stream processing application, wherein the source code comprises source code for a plurality of operators, each of which performs a data processing function;
      determine, by the compiler, one or more characteristics of the plurality of operators within the data stream processing application, wherein said determining comprises:
         injecting profiling code into an instrumented version of the data stream processing application;
         running the data stream processing application under a sample workload;
         using the profiling code to collect one or more computation and communication characteristics of the plurality of operators within the data stream processing application; and
         processing the one or more collected computation and communication characteristics to compute (i), for each of the plurality of operators, an average amount of demanded processing resources and, (ii) for each port of the plurality of operators, a mean data rate;
      group, by the compiler, the plurality of operators into one or more execution containers based on the average amount of demanded processing resources and the mean data rate computations; and
      compile, by the compiler, the source code for the data stream processing application into executable code, wherein the executable code comprises a plurality of execution units, wherein each execution unit contains one or more of the plurality of operators, wherein each operator is assigned to an execution unit based on the grouping, and wherein each execution unit is to be executed in a partition.

15. The system of claim 14, wherein the at least one processor coupled to the memory operative to compile the source code for the data stream processing application into executable code is further operative to fuse the plurality of operators until overhead of one or more tuple transfers is a pre-determined fraction of total cost of executing all operator logic within an execution container.

16. The system of claim 14, wherein the at least one processor coupled to the memory is further operative to:
   output compiled source code, wherein the compiled source code comprises one or more operators fused into one or more partitions.

17. The system of claim 14, wherein the at least one processor coupled to the memory is further operative to:
   create one or more containers that map a data flow graph of one or more data stream operators into a set of one or more executables that are deployable across a set of nodes.

18. The system of claim 17, wherein the at least one processor coupled to the memory operative to create one or more containers is further operative to create one or more containers that fuse one or more operators such that one or more stream connections between the one or more operators within the same container are reduced to one or more function calls.

19. The system of claim 16, further comprising a tangible computer-readable recordable storage medium having one or more distinct software modules embodied thereon, the one or more distinct software modules comprise a profiling module, an optimizer module, a code generation module and a compiler module executing on a hardware processor.

* * * * *